(12) United States Patent
Escamilla et al.

(10) Patent No.: US 8,634,189 B2
(45) Date of Patent: Jan. 21, 2014

(54) SYSTEM AND METHOD FOR RELEASING A PERIPHERAL SLICE FROM AN INFORMATION HANDLING SYSTEM

(75) Inventors: Eduardo Escamilla, Round Rock, TX (US); Philip Seibert, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1419 days.

(21) Appl. No.: 12/024,214

(22) Filed: Feb. 1, 2008

(65) Prior Publication Data

US 2009/0198853 A1 Aug. 6, 2009

(51) Int. Cl.
*G06F 1/16* (2006.01)

(52) U.S. Cl.
USPC ............ 361/679.43; 361/679.32; 361/679.45; 710/303; 710/304

(58) Field of Classification Search
USPC .......................... 361/679.32, 679.41, 679.58
See application file for complete search history.

(56) References Cited

U.S. PATENT DOCUMENTS

| | | | | |
|---|---|---|---|---|
| 5,504,649 A * | 4/1996 | Hosoya et al. | ............ | 361/679.32 |
| 5,724,224 A * | 3/1998 | Howell et al. | ............ | 361/679.19 |
| 5,751,546 A * | 5/1998 | Clark et al. | ............ | 361/679.43 |
| 5,805,412 A * | 9/1998 | Yanagisawa et al. | .... | 361/679.41 |
| 5,818,691 A | 10/1998 | McMahan et al. | | |
| 5,862,036 A | 1/1999 | Lin | | |
| 5,926,627 A * | 7/1999 | Sugimura | ...................... | 710/303 |
| 5,928,017 A * | 7/1999 | Lan | ................. | 439/159 |
| 6,015,308 A * | 1/2000 | Lee et al. | ........................ | 439/155 |
| 6,118,663 A * | 9/2000 | Fan | ................. | 361/725 |
| 6,151,218 A * | 11/2000 | Pirdy et al. | ..................... | 361/727 |
| 6,275,378 B1 | 8/2001 | Lee et al. | | |
| 6,353,536 B1 * | 3/2002 | Nakamura et al. | ........ | 361/679.41 |
| 6,392,383 B1 * | 5/2002 | Takimoto et al. | ............. | 320/115 |
| 6,490,154 B2 | 12/2002 | Thompson | | |
| 6,560,103 B1 * | 5/2003 | Dohi et al. | ............... | 361/679.43 |
| 6,742,070 B2 * | 5/2004 | Fuchida | ........................ | 710/303 |
| 7,085,132 B2 * | 8/2006 | Schlesener et al. | ....... | 361/679.23 |
| 7,380,143 B2 * | 5/2008 | Gold et al. | .................... | 713/300 |
| 7,505,265 B2 * | 3/2009 | Nishiyama | ............... | 361/679.41 |
| 2001/0009502 A1 * | 7/2001 | Ohnishi | ......................... | 361/686 |
| 2005/0128687 A1 * | 6/2005 | Liang et al. | ................... | 361/679 |
| 2007/0112989 A1 * | 5/2007 | Iwaki | ............................. | 710/303 |
| 2007/0223190 A1 * | 9/2007 | Griffith et al. | ................ | 361/686 |
| 2008/0278909 A1 * | 11/2008 | Lev et al. | ....................... | 361/687 |

* cited by examiner

*Primary Examiner* — Anthony Q Edwards
(74) *Attorney, Agent, or Firm* — Terrile, Cannatti, Chambers & Holland, LLP; Robert W. Holland

(57) ABSTRACT

Alignment posts that aid alignment of a peripheral slice to couple to the bottom surface of an information handling system also interface with a release so that actuation of the release translates to movement of the alignment posts relative to the peripheral slice so that the information handling system slides relative to the peripheral slice. Sliding of the peripheral slice relative to the information handling system releases attachment devices, such as hooks of the peripheral device that couple to attachment points of the information handling system so that the peripheral device decouples from the information handling system.

20 Claims, 3 Drawing Sheets

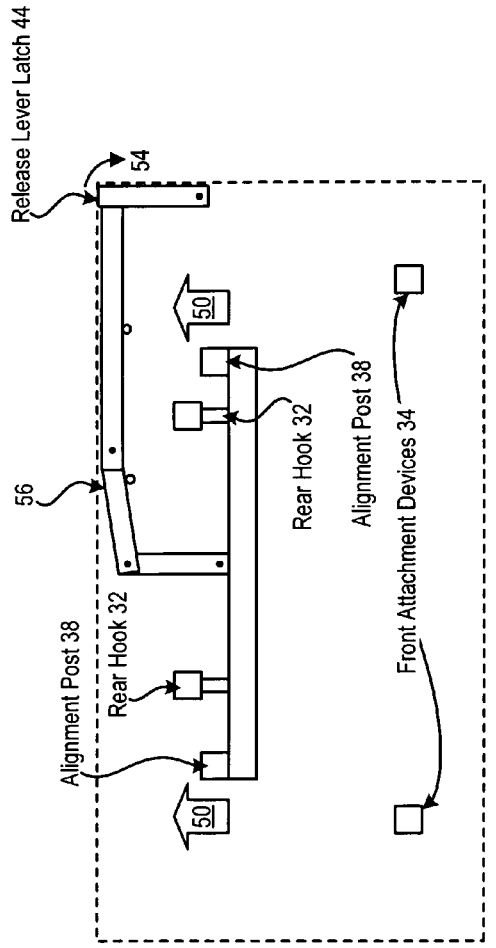
*Figure 3*
*Figure 3B*
*Figure 3A*

SYSTEM AND METHOD FOR RELEASING A PERIPHERAL SLICE FROM AN INFORMATION HANDLING SYSTEM

BACKGROUND OF THE INVENTION

1. Field of the Invention

The present invention relates in general to the field of information handling system attached peripherals, and more particularly to a system and method for releasing a peripheral slice from an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processing components have increased in capability and decreased in size, end users have migrated towards portable information handling systems to replace desktop information handling systems. Portable information handling systems have integrated displays and power sources so that an end user can use the system free from any hard connections, such as an external power plug or external display cable. Portable information handling systems come in a range of sizes. Larger portable information handling systems have room to support powerful processing components and have performance characteristics that rival those of desktop information handling systems. Indeed, end users often adopt larger portable information handling systems as replacements for desktop systems. On the opposite end of the range of sizes, ultraportable information handling systems are built to have a minimal size and weight to make the systems convenient to use when on the go. Because of the small chassis size, ultraportable information handling systems typically use less powerful components and have reduced performance characteristics relative to larger systems. For example, in order to reduce the size of the chassis, ultraportable information handling systems often do not have optical drives and often limit the number of connectors available to interface with external devices.

Although ultraportable information handling systems are convenient to use when on the go, the reduced capabilities make them less appealing in a home or office environment. To address this difficulty and to make ultraportable and other portable information handling systems more powerful in a home or office environment, information handling systems interact with peripheral slices that have selected functionality, such as an optical drive, additional batteries, and additional external connectors. For example, the peripheral slice couples to the bottom of the information handling system and electronically communicates with the information handling system through opposing aligned connectors. The peripheral slices typically have security lock features to protect the information handling system when the peripheral slice is coupled to the system. A security lock feature typically has generous hook engagement to ensure proper protection to the information handling system. Usually, alignment posts extend from the peripheral slice into opposing openings of the information handling system to help align the hooks of the peripheral slice into the hook openings of the information handling system. A difficulty with the use of generous hook engagements is that docking and undocking of the peripheral slice to the information handling system tends to be awkward.

SUMMARY OF THE INVENTION

Therefore a need has arisen for a system and method which aids docking and undocking of a peripheral slice to an information handling system.

In accordance with the present invention, a system and method are provided which substantially reduce the disadvantages and problems associated with previous methods and systems for docking and undocking a peripheral slice to an information handling system. Actuation of a release for releasing the peripheral slice from the information handling system translates to an alignment device that moves the peripheral slice relative to the information handling system so that attachment devices move from a coupling position to a decoupled position.

More specifically, a peripheral slice couples to the bottom surface of an information handling system to add functionality to the information handling system, such as an optical disc drive, a battery or a conduit for external cables to interface with the information handling system. Attachment devices, such as hooks, couple the peripheral slice at attachment points formed in the information handling system. Alignment devices, such as posts, extend from the peripheral slice into alignment receiving points of the information handling system to aid in alignment of the peripheral slice to the information handling system. A release actuates to release the peripheral slice from the information handling system by translating the actuating force to the alignment devices. The alignment devices move relative to the peripheral slice to push against the information handling system so that the system slides relative to the peripheral slice a distance sufficient to release the attachment devices from the attachment points.

The present invention provides a number of important technical advantages. One example of an important technical advantage is that generous hook engagement between a peripheral slice and an information handling system is supported with reduced awkwardness in coupling and uncoupling of the peripheral slice to the information handling system. The release for decoupling of the peripheral slice from the information handling system provides lateral motion of the peripheral slice relative to the engagement hooks so that the hooks decouple with a reduced if any need for manipulation of the peripheral slice relative to the information handling system by an end user. Ease in the coupling and decoupling of the peripheral slice to the information handling system provides an improved end user experience while allowing for the use of sturdy engagement hooks.

BRIEF DESCRIPTION OF THE DRAWINGS

The present invention may be better understood, and its numerous objects, features and advantages made apparent to FIG. 1 depicts a bottom perspective view of an information handling system operable to couple with a peripheral slice;

FIG. 3 depicts an example embodiment of a release lever latch having an actuation translated into movement of alignment posts; and FIGS. 3A and 3B depict translation of a release actuation to a rotational decoupling position of attachment devices.

DETAILED DESCRIPTION

Alignment posts that aid alignment of a peripheral slice to an information handling system also interact with a release so that actuation of the release moves the alignment posts to aid in decoupling of the peripheral slice from the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
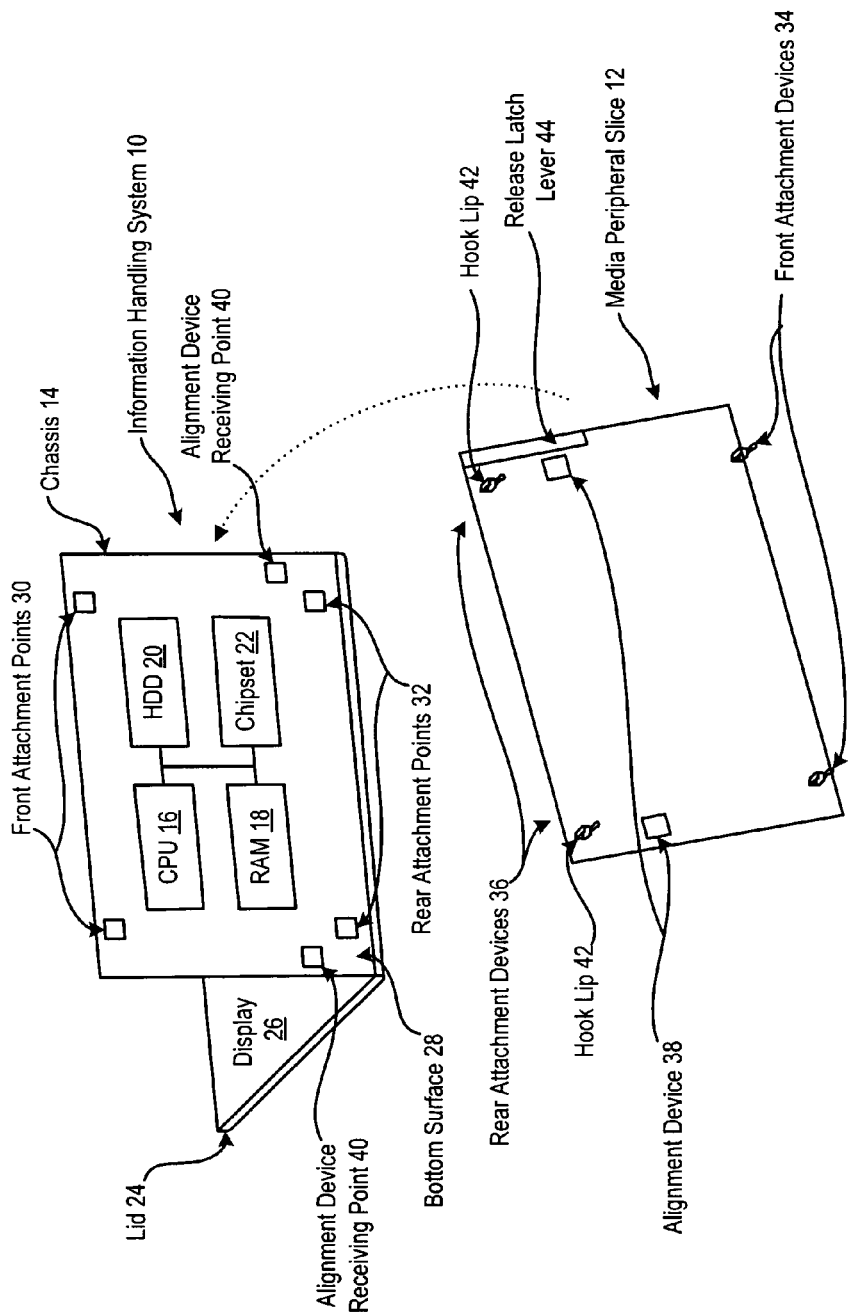

Referring now to FIG. 1, a bottom perspective view depicts an information handling system 10 operable to couple with a peripheral slice 12. Information handling system 10 has a plurality of processing components disposed in a chassis 14 that cooperate to process information, such as a CPU 16, RAM 18, a hard disk drive 20 and a chipset 22. Information handling system 10 is configured as a portable system having a rotationally coupled lid 24 with an integrated display 26. The bottom surface 28 of chassis 14 has front attachment points 30 and rear attachment points 32 that are designed to accept front attachment devices 34 and rear attachment devices 36 of peripheral slice 12. For example, front and rear attachment devices 34 and 36 are hooks that securely fit into lips formed in front and rear attachment points 30 and 32. In order to aid in alignment of peripheral slice 12 to the bottom surface 28 of chassis 12, alignment devices 38 fit into alignment device receiving points 40, such as by inserting posts into post openings. Once alignment devices 40 provide approximate alignment, the hook lip 42 of attachment devices 34 and 36 slide under lips formed at attachment points 30 and 32 to securely couple peripheral slice 12 to information handling system 10. To remove peripheral slice 12 from information handling system 10, peripheral slice 12 is slid relative to information handling system 10 to release attachment devices 34 and 36 from attachment points 30 and 32 and then information handling system 10 is lifted away from peripheral slice 12.

Peripheral slice 12 has a footprint substantially similar to that of bottom surface 28 of chassis 14 so that peripheral slice 12 couples to information handling system 10 as an integral structure. In order to release peripheral slice 12 from information handling system 10, a release 44, such as a latch or lever, is actuated, such as by pulling outward by an end user in an outward motion away from peripheral slice 12. Actuation of release 44 translates to alignment devices 38 to cause alignment devices 38 to move relative to peripheral slice 12. The movement of alignment devices 38 pushes against alignment device receiving points 40 to slide information handling system 10 relative to peripheral device 12. In one embodiment, the movement of alignment device 38 is sufficient to release the hook lip 42 of attachment devices 34 and 36 from under attachment points 30 and 32 so that peripheral slice 12 is freed from coupling to information handling system 10. In an alternative embodiment, actuation of release 44 translates to movement of attachment devices 34 and 36 to more quickly release lip 42, such as by sliding and withdrawing rear attachment devices 36 from rear attachment points 32.

Figure 2:
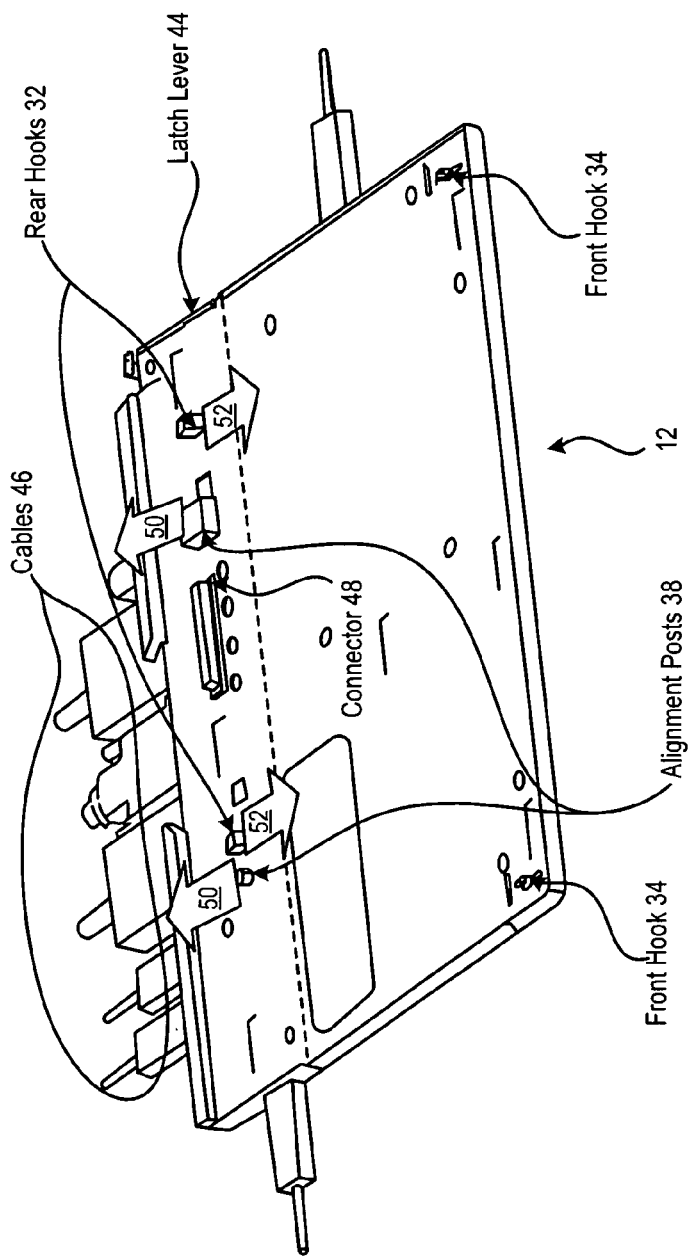
FIG. 2 depicts an upper perspective view of a peripheral slice configured to act as a conduit for electrical signals between an information handling system and external cables.

Referring now to FIG. 2, an upper perspective view depicts a peripheral slice 12 configured to act as a conduit for electrical signals between an information handling system and external cables 46. When an information handling system couples over top of peripheral slice 12, a connector on the information handling system couples with a connector 48 of peripheral slice 12 so that external devices can communicate with the information handling system through cables 46. In alternative embodiments, peripheral slice 12 can have a variety of functions, such as by including an optical disc drive, extra battery cells or by providing a thermal barrier at the bottom surface of an information handling system. Arrows 50 depict the direction of motion imparted on alignment posts 38 when latch lever 44 is actuated. By moving in the direction of arrow 50 and pressing against a surface of the information handling system, alignment posts 38 slide peripheral slice 12 in the direction of arrow 52 relative to the information handling system 10. Sliding peripheral slice 12 a distance sufficient to release rear hooks 32 and front hooks 34 from the information handling system decouples peripheral slice 12 from the information handling system.

Referring now to FIG. 3, an example embodiment is depicted of a release lever latch 44 having an actuation translated into movement of alignment posts 38. As release lever latch 44 rotates outward in the direction of arrow 54, a pivoting arm 56 translates the force from the movement of release 44 into a lateral movement relative to the information handling system so that a bearing arm 58 coupled to alignment posts 38 moves alignment posts 38 in the direction of arrow 50. In addition to moving peripheral slice 12 relative to an information handling system, actuation of release 44 translates through bearing arm 58 to rear hooks 32 to aid in removal of rear hooks 32 from their attachment points within an information handling system. FIG. 3A depicts a rear hook 32 before actuation of release 44. FIG. 3B depicts a rear hook 32 after actuation of release 44. Actuation of release 44 translates to a rotation of hook 32 to aid in removal of hook 32 from its coupling position within an information handling system.

Although the present invention has been described in detail, it should be understood that various changes, substitutions and alterations can be made hereto without departing from the spirit and scope of the invention as defined by the appended claims.

What is claimed is:

1. An information handling system comprising:
a chassis having a bottom surface, the bottom surface having plural attachment points and at least one alignment receiving point, the attachment points operable to couple to attachment devices of a peripheral slice, the alignment receiving point operable to engage an alignment device of the peripheral slice;
plural processing components disposed in the chassis, the processing components operable to process information;
a peripheral slice sized to couple to the bottom surface, the peripheral slice having plural attachment devices aligned to couple at the plural attachment points and at least one alignment device aligned to couple at the alignment receiving point; and
a release interfaced with the alignment device, the release operable to interact with the alignment device to move the peripheral slice relative to the chassis by moving the peripheral slice with the alignment device to aid in release of the attachment devices from the attachment points.

2. The information handling system of claim 1 wherein the peripheral slice comprises an optical disc drive.

3. The information handling system of claim 1 wherein the peripheral slice comprises a battery.

4. The information handling system of claim 1 wherein the peripheral slice comprises a conduit for external cables to interface with the processing components.

5. The information handling system of claim 1 wherein the release comprises a lever coupled to the at least one alignment device, the lever moving the alignment posts relative to the peripheral slice to slide the peripheral slice relative to the chassis.

6. The information handling system of claim 5 wherein the release is further operable to move at least some of the attachment devices to aid release of the at least some attachment devices from the attachment points.

7. The information handling system of claim 6 wherein the attachment devices comprise hooks.

8. The information handling system of claim 6 wherein the alignment device comprises plural posts extending outward from the peripheral slice.

9. A method for decoupling a peripheral slice from an information handling system, the method comprising:
actuating a release;
translating the actuating of the release to slide the peripheral slice relative to the information handling system; and
sliding the peripheral slice relative to the information handling system by a distance sufficient to release attachment devices that couple the peripheral slice to the information handling system from associated attachment points.

10. The method of claim 9 wherein translating the actuating further comprises applying a force from the actuating of the release to an alignment device that aids alignment of the peripheral slice and the information handling system.

11. The method of claim 9 wherein the attachment devices comprise hooks extending from the peripheral slice and the distance sufficient to release comprises at least the distance of a lip formed by the hook.

12. The method of claim 9 wherein the peripheral slice comprises an optical disc drive.

13. The method of claim 9 wherein the peripheral slice comprises a battery.

14. The method of claim 9 wherein the peripheral slice comprises a conduit for external cables to interface with the processing components.

15. The method of claim 9 wherein translating the actuating of the release further comprises:
moving an attachment device to release the attachment device from coupling the peripheral slice to the information handling system; and
moving a portion of the peripheral slice to generate lateral motion of the peripheral slice relative to the information handling system.

16. A system for decoupling a peripheral slice from an information handling system, the system comprising:
one or more alignment devices operable to align the peripheral slice and the information handling system during coupling of the peripheral slice to the information handling system; and
a release interfaced with at least one alignment device, the release operable to translate an actuation to move the at least one alignment devices, movement of the at least one alignment device translated to the peripheral slice so that the peripheral slice slides relative to the information handling system.

17. The system of claim 16 wherein the peripheral slice and the information handling system have substantially the same footprint, the peripheral slice coupling to a bottom surface of the information handling system.

18. The system of claim 16 wherein the peripheral slice comprises an optical disc drive.

19. The system of claim 16 wherein the peripheral slice comprises a battery.

20. The system of claim 16 wherein the peripheral slice comprises a conduit for external cables to interface with the processing components.

* * * * *